(12) United States Patent
Paul

(10) Patent No.: US 10,253,897 B2
(45) Date of Patent: Apr. 9, 2019

(54) WATER PUMP WITH CHECK VALVE

(71) Applicant: OASE GmbH, Hörstel-Riesenbeck (DE)

(72) Inventor: Ansgar Paul, Oldenburg (DE)

(73) Assignee: OASE GmbH, Hörstel-Riesenbeck (DE)

( * ) Notice: Subject to any disclaimer, the term of this patent is extended or adjusted under 35 U.S.C. 154(b) by 0 days.

(21) Appl. No.: 15/477,123

(22) Filed: Apr. 3, 2017

(65) Prior Publication Data

US 2017/0284551 A1 Oct. 5, 2017

(30) Foreign Application Priority Data

Apr. 1, 2016 (DE) .................. 10 2016 106 039

(51) Int. Cl.
| | |
|---|---|
| *F16K 15/18* | (2006.01) |
| *F04D 15/00* | (2006.01) |
| *F04D 29/70* | (2006.01) |
| *F16K 15/06* | (2006.01) |
| *F04D 29/42* | (2006.01) |
| *F04D 1/00* | (2006.01) |
| *F04D 9/00* | (2006.01) |
| *F16K 24/00* | (2006.01) |

(52) U.S. Cl.
CPC .............. *F16K 15/18* (2013.01); *F04D 1/00* (2013.01); *F04D 9/006* (2013.01); *F04D 9/008* (2013.01); *F04D 15/0005* (2013.01); *F04D 29/426* (2013.01); *F04D 29/4293* (2013.01); *F04D 29/708* (2013.01); *F16K 15/063* (2013.01); *F16K 24/00* (2013.01)

(58) Field of Classification Search
CPC . F04D 1/00; F04D 9/006; F04D 9/008; F04D 15/0005; F04D 29/426; F04D 29/4293; F04D 29/708; F16K 15/063; F16K 24/00
See application file for complete search history.

(56) References Cited

U.S. PATENT DOCUMENTS 9,879,792 B1 * 1/2018 Wyatt ..................... F16K 15/18

FOREIGN PATENT DOCUMENTS

| AT | 250 107 | 10/1966 |
|---|---|---|
| DE | 31 04 362 | 8/1982 |
| DE | 199 23 349 | 4/2000 |
| DE | 10 2005 036 136 | 2/2007 |
| DE | 5 045 861 | 3/2007 |
| FR | 2 503 319 | 10/1982 |
| GB | 17796 A.D. 1912 | 4/1913 |

* cited by examiner

*Primary Examiner* — P. Macade Nichols
(74) *Attorney, Agent, or Firm* — Gudrun E. Huckett

(57) ABSTRACT

A water pump has a check valve with a valve body movable in a direction of a valve axis of the check valve between an open position of the check valve and a closed position of the check valve. An actuating device is connected with the check valve and has an operating element that is movable coaxially to the valve axis. The operating element is operatively connected to the valve body and arranged such that the operating element, by applying a coaxial force to the valve body, transfers the valve body into a venting position of the check valve.

5 Claims, 4 Drawing Sheets

WATER PUMP WITH CHECK VALVE

BACKGROUND OF THE INVENTION

The invention relates to a water pump, in particular for use as a garden pump or domestic water supply, that comprises a check valve with a valve body that is movable in the direction of the valve axis between an open position and a closed position. The check valve is connected to an actuating device by means of which the check valve can be transferred into a venting position. The water pump thus comprises a check valve that can be moved into a venting position by means of an actuating device.

Garden pumps, for example, are generally self-priming pumps. Such pumps are provided with a check valve in order to prevent that the water column drops in the suction conduit when the pump is not operating; a water column drop would require the priming step to be repeated any time pump operation is to be started again.

Prior to the initial operation of the pump, the pump chamber must be filled with water so that the self-priming action can function. For this purpose, the check valve must be opened so that water can flow into the pump chamber because the water pressure of the incoming water when simply filling the pump chamber is not sufficient to automatically open the check valve.

In the prior art, constructions are thus known that provide for manual movement of the check valve into a venting position. For example, DE 10 2005 045 861 A1 describes a pump construction in which an actuating device that is movable orthogonally to the valve axis can move the check valve for venting purposes into an open position during pump operation and secure it in this position. This construction is however limited in regard to its function and reliability because the check valve can easily cant and the entire construction is subject to great wear.

It is therefore an object of the invention to improve the construction of a pump of the aforementioned kind.

SUMMARY OF THE INVENTION

This object is solved by a water pump wherein the actuating device comprises an operating element that is movable coaxially to the valve axis, that engages the valve body, and is arranged such that it can transfer the valve body by a coaxial force action into the at least slightly open venting position.

By means of the coaxial arrangement of the actuating device relative to the valve axis of the check valve in accordance with the invention, no lateral forces generated by the actuating device are acting in the construction according to the invention. For a purely coaxial arrangement, the required seals are also not loaded with laterally acting forces and therefore the seals wear much slower than in known constructions. The coaxial force action on the check valve in accordance with the invention prevents also that canting occurs, observed frequently in the prior art, because additional forces that are oriented orthogonal to the main closure direction of the check valve are prevented by the invention.

Preferably, the water pump according to the invention is designed such that the actuating device is located on the side of the opening of the check valve and the operating element is acting on the valve body by a pulling force. In particular, for this purpose a follower is provided on the valve body by means of which, by the pulling action applied by the operating element, the check valve can be opened into the venting position. For this purpose, the operating element is designed preferably as a manually actuatable venting button.

The follower and the valve body can be embodied together as one piece and the follower can extend, for example, like a cage about the expansion portion of the operating element. Of course, also the reverse construction is possible in which the operating element engages about a follower part of the check valve. Preferably, the follower and the valve body can be designed together as one piece in particular for stability and manufacturing reasons.

Since for initial filling of the pump with water a slightly open venting position of the check valve is sufficient, the operating element of the actuating device must only perform a short displacement travel. In order to subsequently ensure full water flow and complete opening of the check valve when operating the pump, it can therefore be advantageous to provide the connection between the follower and the operating element such that in axial direction a free range of movement is provided. In this way, the check valve can be opened completely by the applied suction pressure of the pump without the operating element of the actuating device having to be moved farther.

Preferably, the actuating device is designed such that it can be moved manually into a venting position but enables automatic return of the check valve into the completely closed position without requiring an additional manual action when switching off the pump after use. In this context, it is advantageous to select a force-locked fixation of the operating element of the actuating device. Preferably, this can be provided by means of friction of the sealing elements that are required anyway. The introduced fixation or friction force is to be designed such that it is greater than the existing pretensioning force of the check valve that is mandatorily required for the function of the check valve so that the manually adjusted venting position is maintained for the filling process of the pump. On the other hand, the fixation force of the actuating device is however to be designed smaller than the restoring force that is acting on the check valve when the pump is switched off; this restoring force is generally the sum of the pretensioning force and a pressure force of the existing water column. Accordingly, upon switching off the pump, the check valve is automatically forced into its completely closed position without having to manually release the fixation of the actuating device.

BRIEF DESCRIPTION OF THE DRAWING

Further advantages and details result from the dependent claims as well as from the embodiment illustrated in the drawing which will be explained in the following in more detail.

DESCRIPTION OF THE PREFERRED EMBODIMENTS

Figure 1:
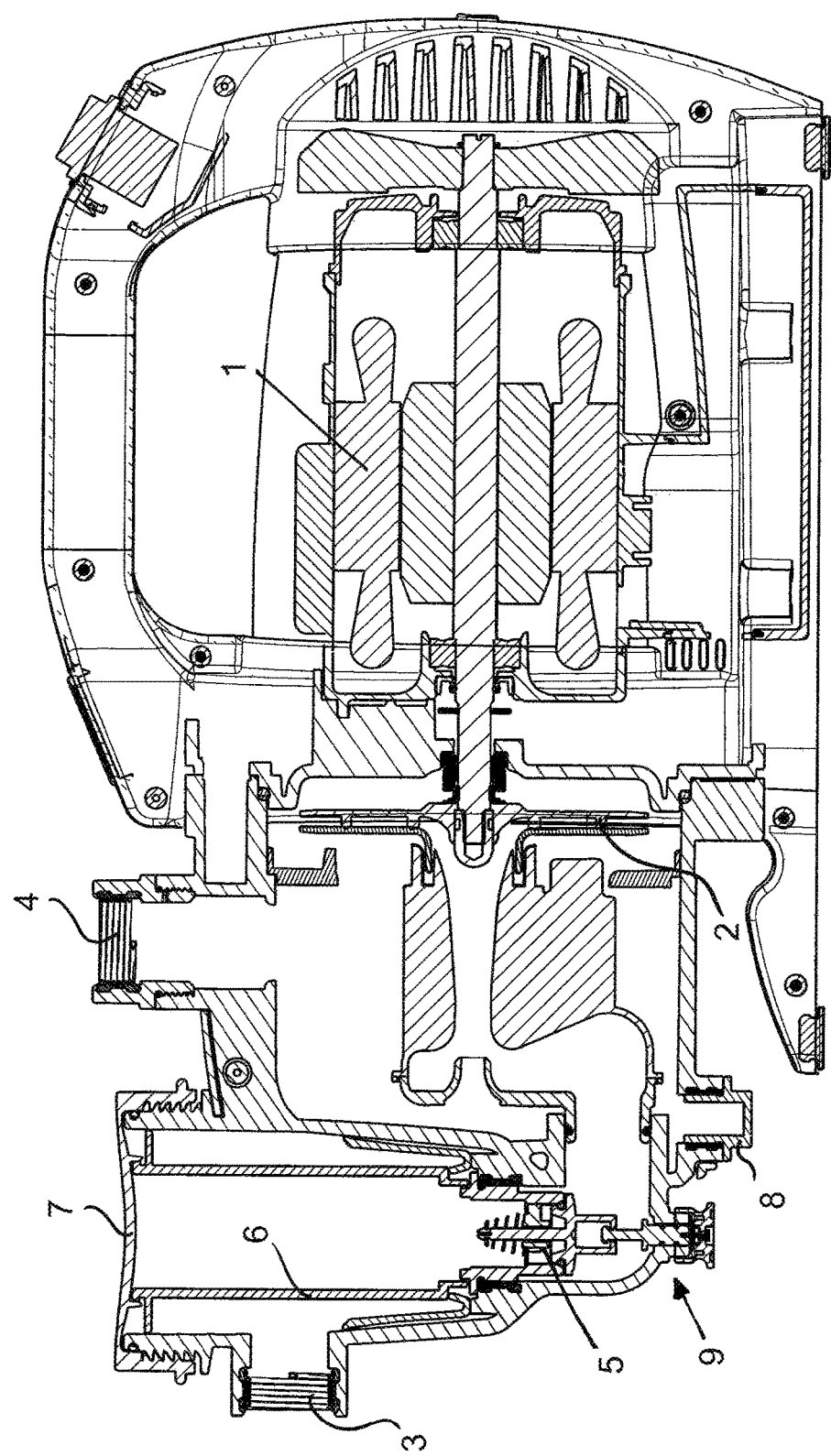
FIG. 1 shows the pump according to the invention in a section view.

The pump, illustrated in its entirety in FIG. 1, comprises a motor 1 that drives an impeller 2. By means of a suction socket 3 water can be sucked in, and by means of pressure socket 4 water can be discharged from the pump. In the suction area, a check valve 5 is arranged and a filter 6 is arranged upstream thereof. The filter 6 can be inserted and can be exchanged through a topside opening closed off by a filter cover 7. In the bottom area of the pressure chamber a drain screw 8 is provided by means of which residual water can be drained from the pump when it is to be transferred into an inoperative state. An actuating device 9 is connected to the check valve 5 for venting the pump during the filling process. The function of the actuating device 9 and its interaction with the check valve 5 will be explained in more detail in the following with the aid of FIGS. 2 to 4.

Figure 2:
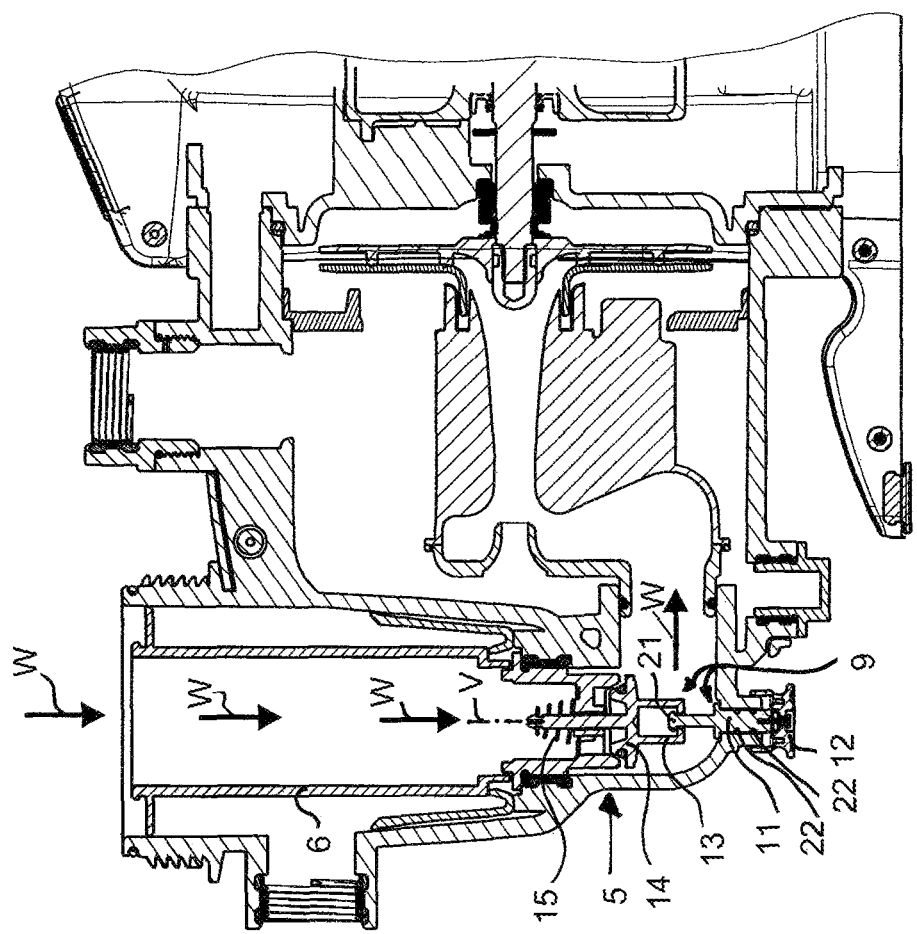
FIG. 2 is a detail illustration in accordance with FIG. 1 during filling of the pump.

FIG. 2 shows the filling process in which the pump is filled with water (symbolized by arrows W) prior to initial starting of the motor 1 so that upon starting of the motor 1 the self-priming action of the pump is operative. This initial filling is done in the simplest way in that the filter cover 7 is unscrewed and water (arrows W) is filled in through the filter 6. In order for the water to fill also the pump chamber behind the check valve 5, the check valve 5 is moved by means of the actuating device 9 into the slightly open venting position which is illustrated in FIG. 2. This is done in the illustrated embodiment in that an operating element 11 of the actuating device 9 is pulled coaxially to the valve axis V in downward direction by means of a venting button 12. The operating element 11 is slidably connected with a follower 13 for this purpose; this follower 13 and the valve body 14 of the check valve 5 are formed together as one piece in the illustrated embodiment. In this context, the mushroom-type expansion portion 21 of the operating element 11 pulls the follower 13 and thereby also the valve body 14 in downward direction against the pretensioning force of the check valve 5. In the illustrated embodiment, the pretensioning force is applied by a spring 15 of the check valve 5. The slightly open venting position is frictionally secured by friction forces or clamping forces applied by the O-rings 22 of the operating element 11; the O-rings 22 provide at the same time a sealing action.

Figure 3:
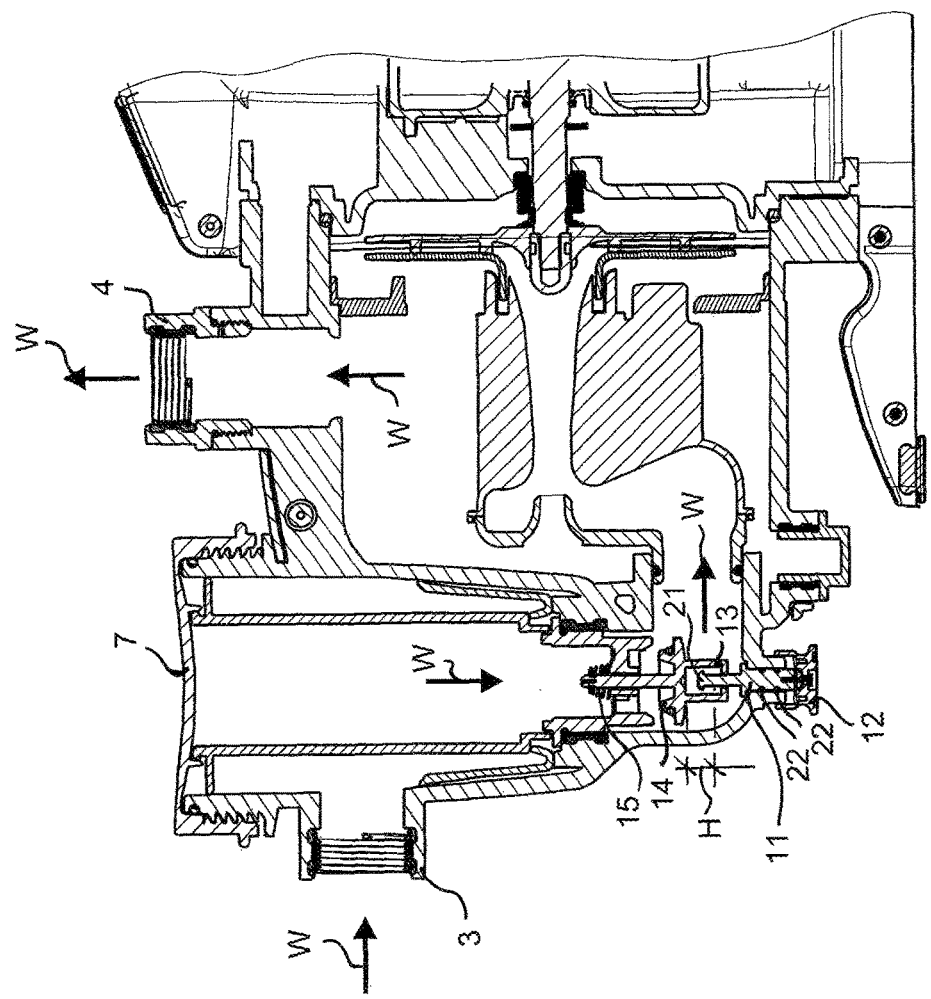
FIG. 3 shows the detail view of FIG. 2 in the operating state of the pump.

FIG. 3 shows the pump during conveying, i.e., after completion of the filling process of FIG. 2. For this purpose, in FIG. 3 the filter cover 7 is attached again and the motor 1 is started. The motor 1 sucks in water (arrows W) through the intake socket 3 by means of the impeller 2 and discharges the water through the pressure socket 4. Due to the water pressure which is existing at the suction side, the check valve 5 is moved against the tensioning force of the spring 15 into the completely open position illustrated in FIG. 3.

Constructively and in particular for reasons of seal tightness, it is advantageous to keep the displacement travel of the operating element 11 as small as possible. Between the operating element 11 and the follower 13, a free range of movement H like a free lift is provided so that the operating element 11 must not carry out a further movement for reaching the completely open position of the check valve 5 according to FIG. 3. In the illustrated embodiment, the top end of the operating element 11 with its expansion portion 21 moves into the cage-like opening of the follower 13 without the operating element 11 performing a further movement.

Figure 4:
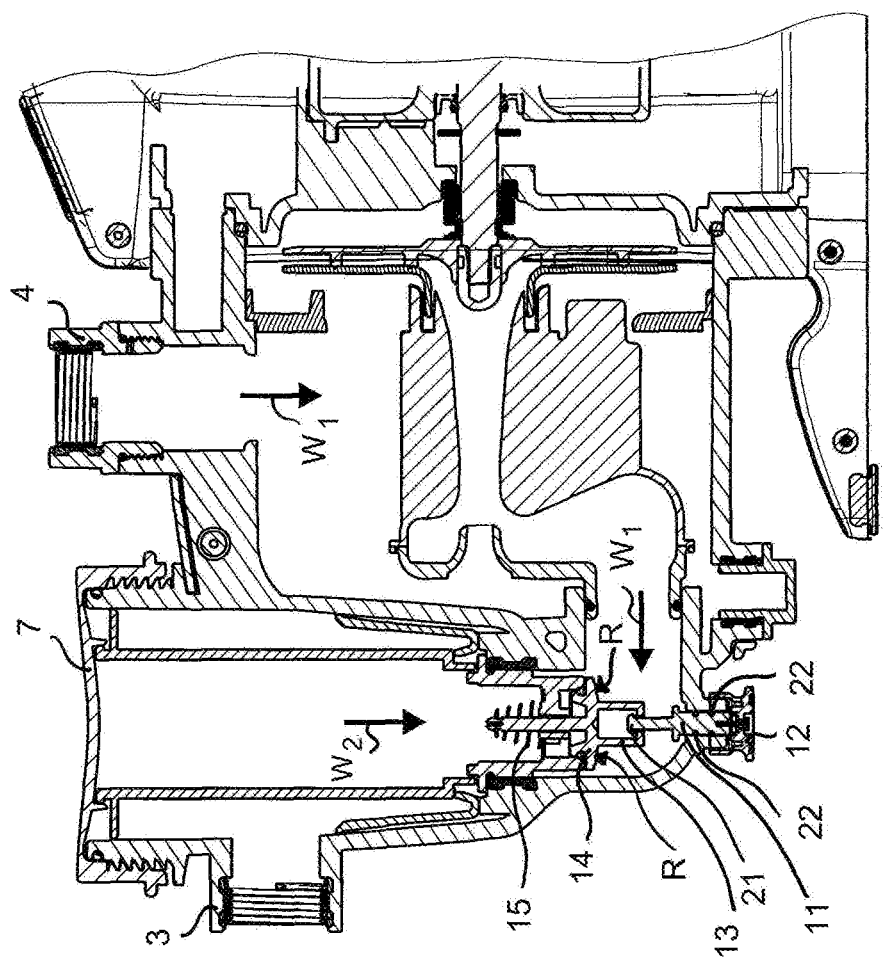
FIG. 4 shows the detail view of FIG. 2 in the switched-off state of the pump.

FIG. 4 shows the pump with motor 1 switched off, i.e., in a function position in which the pump does not convey water. In this position, the water column drops out of the pressure socket 4 in the direction of arrow W1. Only a minimal water pressure W2 on the filter side is counteracting this. The water pressure W1 is acting on the restoring surface R of the check valve body 14 and forces it into the completely closed position as illustrated in FIG. 4 and FIG. 1. The restoring force which is the sum of the water pressure W1 and of the tensioning force of the spring 15 is greater than the fixation force or friction force/clamping force of the operating element 11, applied by the O-rings 22, and the pressure of the water column W2 present on the filter side. In the position illustrated in FIG. 4, with the motor 1 switched off, the check valve 5 therefore entrains the actuating device 9 completely into the initial position by means of the connection between the follower 13 provided on the valve body 14 and the expansion portion 21 of the operating element 11; this entrainment does not require any type of manual actuation. The check valve 5 functions therefore automatically and no problems, as those encountered is case of some prior art pumps, are created when forgetting to terminate the initiated venting position.

The pump according to the invention thus operates in a way to prevent operating errors. Since by means of the actuating device 9 no transverse forces are introduced into the check valve 5 for venting, the check valve 5 also functions without canting. Also, the existing sealing elements must absorb fewer transverse forces than in case of prior art designs so that the pump is significantly less prone to wear. On the other hand, the construction is simple so that manufacturing and assembly costs for the pump are additionally reduced in comparison to the prior art.

The specification incorporates by reference the entire disclosure of German priority document 10 2016 106 039.9 having a filing date of Apr. 1, 2016.

While specific embodiments of the invention have been shown and described in detail to illustrate the inventive principles, it will be understood that the invention may be embodied otherwise without departing from such principles.

What is claimed is:

1. A water pump comprising:
an impeller arranged in a pump chamber;
a motor operatively connected to the impeller to drive the impeller;
a suction socket and a pressure socket, wherein water is sucked in through the suction socket into the pump chamber and discharged from the pump chamber through the pressure socket when the impeller is driven;
a check valve comprising a valve body movable in a direction of a valve axis of the check valve between an open position of the check valve and a closed position of the check valve;
an actuating device connected with the check valve and comprising an operating element movable coaxially to the valve axis;
the operating element operatively connected to the valve body and arranged such that the operating element, when manually actuated, applies a coaxial force to the valve body and transfers the valve body into a venting position of the check valve for a filling process of the water pump;
wherein the actuating device comprises a frictional fixation of the operating element, wherein the frictional fixation of the operating element generates a fixation force, wherein the fixation force is greater than a pretensioning force of the check valve and solely the fixation force maintains the venting position of the check valve when the operating element has been actuated;
wherein the fixation force is smaller than a constructively defined restoring force acting on the check valve when switching off the water pump and the constructively defined restoring force automatically forces the check valve into the closed position without requiring a manual release of the actuation device.

2. The water pump according to claim 1, further comprising a follower arranged on the valve body, wherein the actuating device is arranged on an open side of the check valve, and wherein the operating element is connected to the follower such that a pulling action applied by the operating element on the follower transfers the valve body into the venting position of the check valve.

3. The water pump according to claim 2, wherein the follower and the valve body are formed together as one piece.

4. The water pump according to claim 3, wherein the operating element is connected to the follower by a connection enabling the operating element to move coaxial to the valve axis.

5. The water pump according to claim 4, wherein the connection of the follower and the operating element provides a free range of movement in an axial direction of the valve axis and the free range of movement enables complete opening of the check valve from the venting position into the open position without additional movement of the operating element.

* * * * *